(12) United States Patent
Asano et al.

(10) Patent No.: US 12,549,172 B2
(45) Date of Patent: Feb. 10, 2026

(54) SWITCH OVERCURRENT MEASURING APPARATUS

(71) Applicant: DENSO CORPORATION, Aichi-pref. (JP)

(72) Inventors: Atsuki Asano, Kariya (JP); Yoshinori Hayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 125 days.

(21) Appl. No.: 18/639,361

(22) Filed: Apr. 18, 2024

(65) Prior Publication Data

US 2024/0267039 A1    Aug. 8, 2024

Related U.S. Application Data

(63) Continuation of application No. PCT/JP2022/035499, filed on Sep. 22, 2022.

(30) Foreign Application Priority Data

Oct. 18, 2021  (JP) ................. 2021-170406

(51) Int. Cl.

| H03K 17/08 | (2006.01) |
|---|---|
| H02P 27/06 | (2006.01) |
| H03K 17/0814 | (2006.01) |
| H03K 17/16 | (2006.01) |

(52) U.S. Cl.
CPC ....... *H03K 17/08142* (2013.01); *H02P 27/06* (2013.01); *H03K 17/162* (2013.01); *H03K 2217/0027* (2013.01)

(58) Field of Classification Search
CPC ...... H03K 17/00; H03K 17/08; H03K 17/081; H03K 17/08104; H03K 17/0814; H03K 17/08142; H03K 17/0412; H03K 17/04123; H03K 17/16; H03K 17/161; H03K 17/162; G05F 1/573; G05F 1/569; G05F 1/562; G05F 1/56; G05F 1/46

See application file for complete search history.

(56) References Cited

U.S. PATENT DOCUMENTS 12,184,054 B2 *  12/2024  Takuma .................. H02H 3/087
12,278,621 B2 *   4/2025  Abdesselam .... H03K 17/08104

FOREIGN PATENT DOCUMENTS

JP            2013-118777 A         6/2013

* cited by examiner

*Primary Examiner* — Hai L Nguyen
(74) *Attorney, Agent, or Firm* — Oliff PLC

(57) ABSTRACT

A switch overcurrent measuring apparatus includes an electrical path with a first end connecting with a high potential terminal of a pair of major terminals of a target-driven switch, a diode arranged in the electrical path to have a cathode facing the high potential terminal, and an overcurrent measuring device which connects with a second end of the electrical path. After a command for the switch is changed to an ON-command, the device measures voltage developed between the terminals. When the voltage is higher than an overcurrent threshold, the device determines that an overcurrent is flowing. A damping device arranged in the electrical path has a property that an impedance thereof at a given frequency band is higher than that in a frequency band outside. The given frequency band includes a ringing frequency band of voltage which appears between the terminals and arises from switching between operating states.

12 Claims, 12 Drawing Sheets

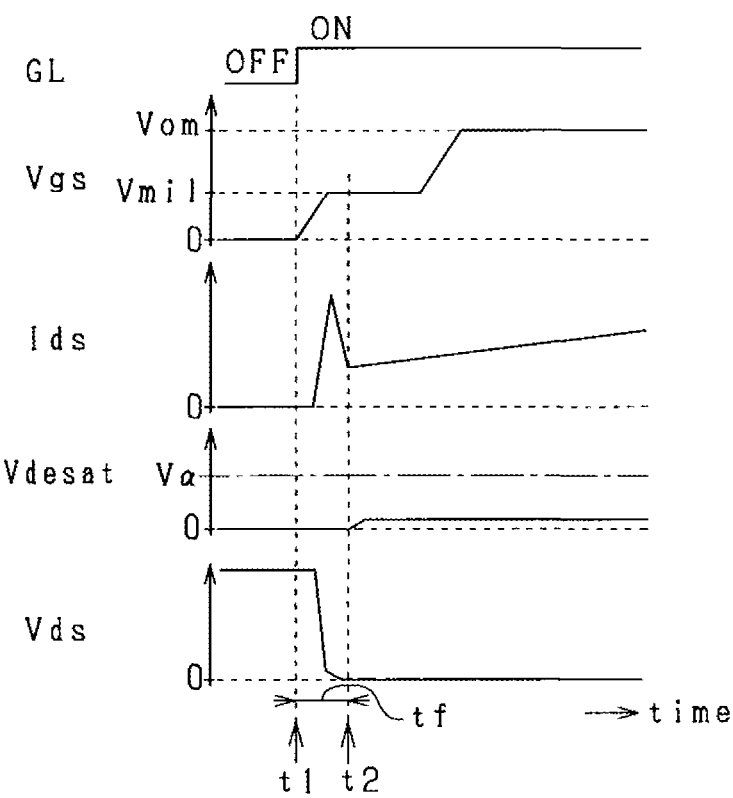
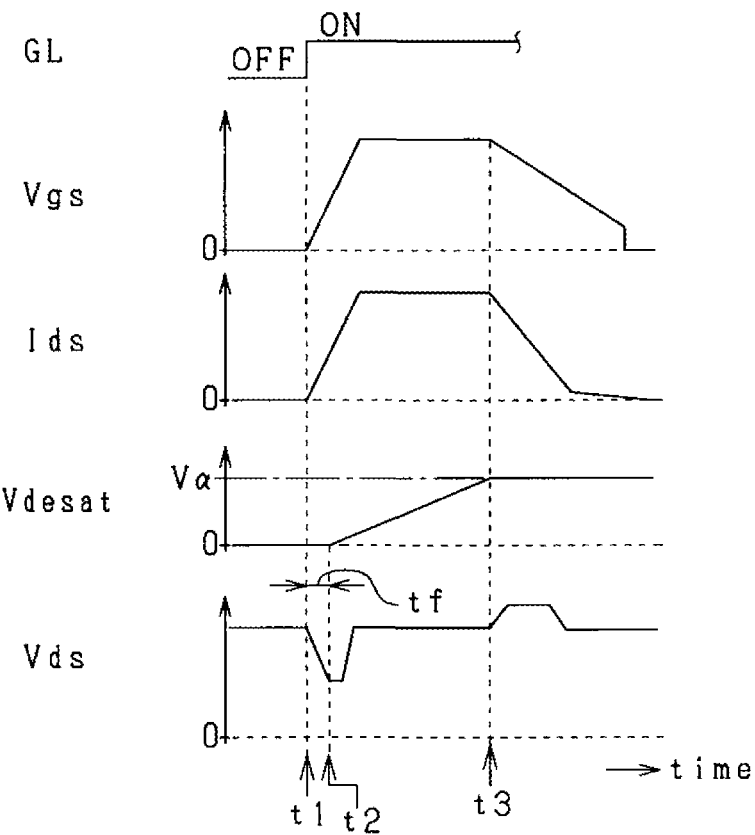

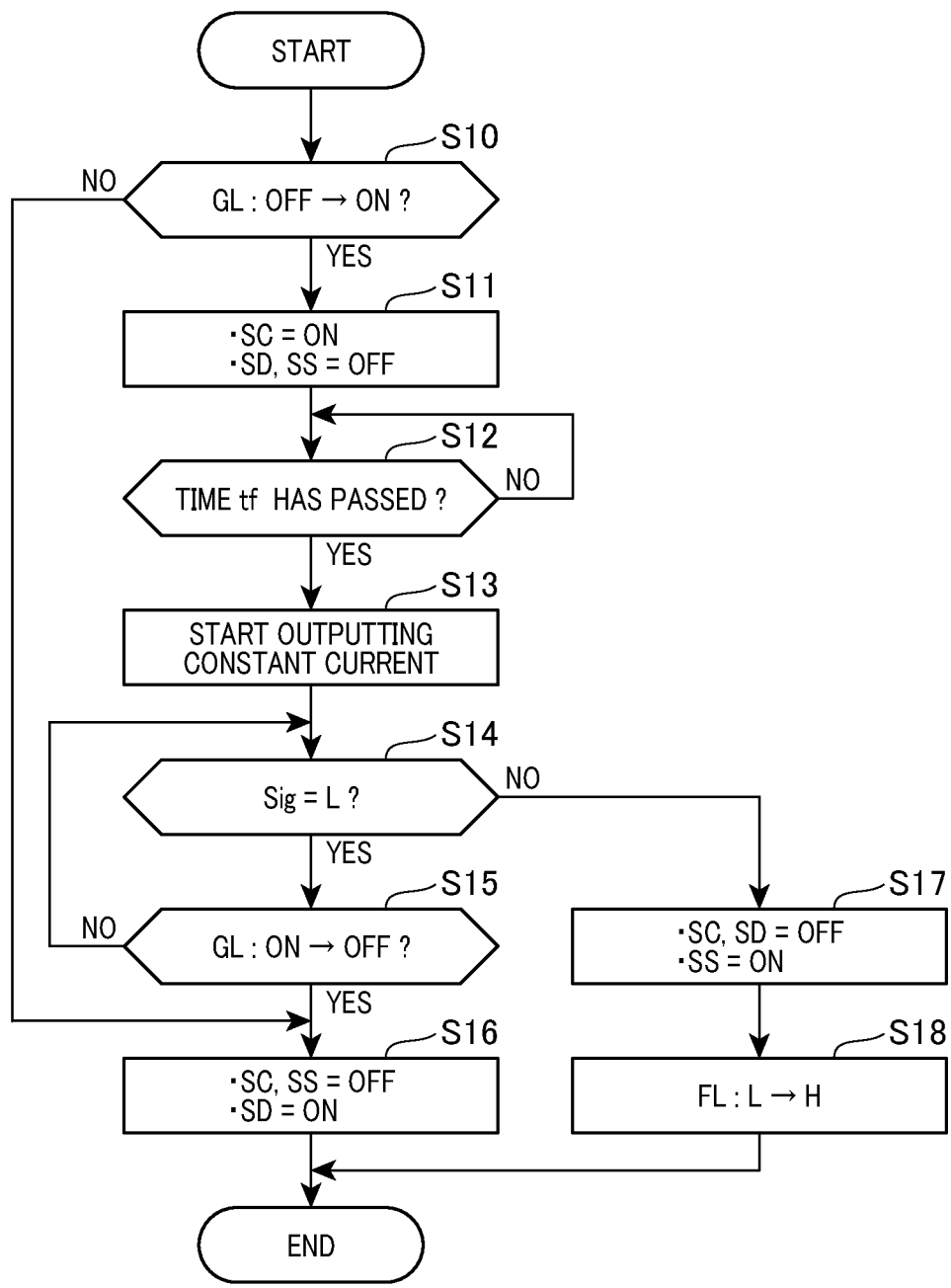

COMPARATIVE EXAMPLE
FIG.6(a) GL
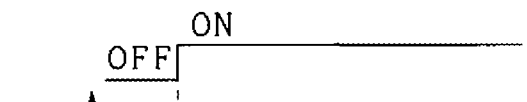
FIG.6(b) Vgs
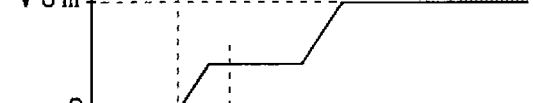
FIG.6(c) Ids
FIG.6(d) Vdesat
FIG.6(e) Vds
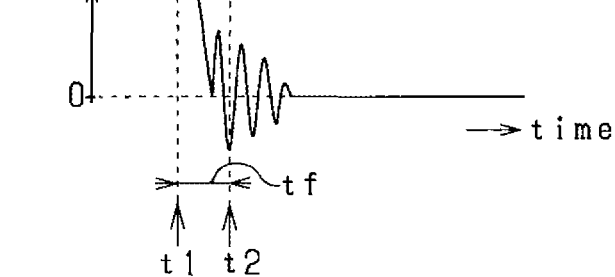
FIG.7
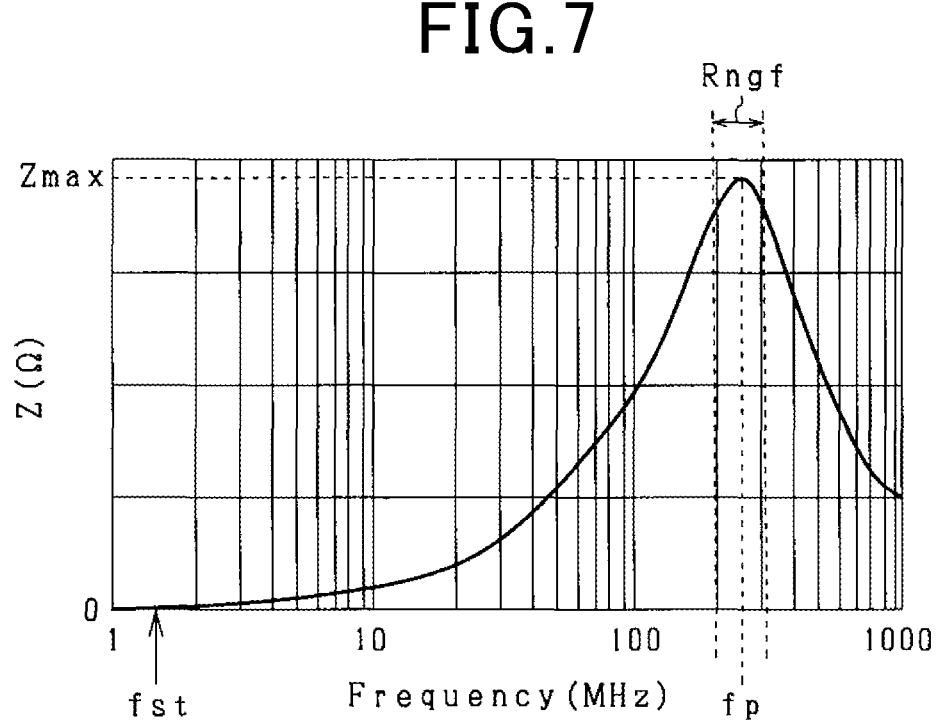

SWITCH OVERCURRENT MEASURING APPARATUS

CROSS REFERENCE TO RELATED DOCUMENT

The present application claims the benefit of priority of Japanese Patent Application No. 2021-170406 filed on Oct. 18, 2021, the disclosure of which is incorporated in its entirety herein by reference.

TECHNICAL FIELD

This disclosure relates generally to a switch overcurrent measuring apparatus.

BACKGROUND OF ART

The above type of a switch overcurrent measuring apparatus is known which is used with an electrical power converter, such as an inverter, which includes upper and lower arm switches. Each of the upper arm switches (which will also be referred to below as a first switch) and a corresponding one of the lower arm switches (which will also be referred below to as a second switch) are alternately turned on. The switch overcurrent measuring apparatus works to measure voltage appearing between a pair of major terminals of the first switch in the on-state and, when the measured voltage is higher than a voltage threshold, determines that an overcurrent is flowing through the first switch.

The switching between operating states or on-off states of the first switch or the second switch will result in ringing of voltage appearing between the major terminals of the first switch or the second switch which is in the on-state. Ringing is an oscillation of the voltage arising from resonance between an intrinsic inductor, such as a conductor connecting with the major terminals of the switch, and an intrinsic capacitor of the switch. The ringing may result in an error in determination that an overcurrent is flowing through the switch, thereby leading to decreased accuracy in measurement of the overcurrent using the voltage between the major terminals of the switch.

In order to avoid the decrease in measurement accuracy, the first patent literature teaches a failure detector working to measure voltage between the major terminals of the first switch at a time when a ON-command for the first switch is changed to an OFF-command. When the measured voltage is higher than a given threshold level, the failure detector determines that a short is occurring at the second switch. Usually, a time lag exists from when the operating command for the first switch is changed to the ON-command until the first switch is changed to the off-state, so that no ringing noise is added to the voltage measured at the above time. The failure detector taught in the first patent literature is, therefore, capable of minimizing a risk that ringing arising from switching of the operating state of the first switch to the off-state may decrease the accuracy in detecting a short-circuit at the second switch.

PRIOR ART DOCUMENT

Patent Literature

FIRST PATENT LITERATURE: Japanese Patent First Publication No. 2013-118777

SUMMARY OF THE INVENTION

Quick detection of the flow of overcurrent requires comparison of voltage across the major terminals of the first switch, as measured immediately after the first switch is changed from the off-state to the on-state, with the threshold level. There is, however, a risk that ringing noise may be added to the voltage appearing across the major terminals of the first switch immediately after the first switch is changed to the on-state, thereby resulting in decreased accuracy in detecting overcurrent. There is, therefore, still room for improvement in quick detection of the overcurrent.

It is a principal object of this disclosure to provide an overcurrent measuring apparatus capable of quickly measuring an overcurrent flowing through a switch.

This disclosure is to provide a switch overcurrent measuring apparatus comprising: (a) an electrical path which has a first end connecting with a high potential terminal that is one of a pair of major terminals of a target-driven switch; (b) a diode which is arranged in the electrical path to have a cathode facing the high potential terminal of the target-driven switch; and (c) an overcurrent measuring device which connects with a second end of the electrical path. After a command for the target-driven switch is changed to an ON-command, the overcurrent measuring device works to measure a voltage developed between the major terminals of the target-driven switch through the electrical path. In response to the voltage measured by the overcurrent measuring device being higher than an overcurrent threshold, the overcurrent measuring device determines that an overcurrent is flowing between the major terminals of the target-driven switch. A damping device is arranged in the electrical path. The damping device has a property that an impedance thereof at a given frequency band is higher than that in a frequency band outside the given frequency band. The given frequency band includes a ringing frequency band (Rngf) of voltage which appears between the major terminals of the target-driven switch and arises from switching between operating states of the target-driven switch.

In the above structure, upon occurrence of ringing of voltage across the major terminals of the target-driven switch which results from the switching of the operating state of the target-driven switch to the off-state, the damping device which has the above property and is disposed in the electrical path serves to reduce or avoid the addition of ringing noise to voltage measured through the electrical path. This ensures the stability in determining whether the measured voltage is higher than the overcurrent threshold without having to wait for convergence of the ringing after the target-driven switch is turned on. The above structure is, therefore, capable of detecting the presence of overcurrent without producing a decrease in accuracy in measuring the overcurrent.

BRIEF DESCRIPTION OF THE DRAWINGS

The above-described object, other objects, features, or beneficial advantages in this disclosure will be apparent from the following detailed discussion with reference to the drawings.

In the drawings:

FIGS. 3(a), 3(b), 3(c), 3(d), and 3(e) are timing charts which demonstrate changes in drive signals and determination voltage in the absence of overcurrent;

FIGS. 4(a), 4(b), 4(c), 4(d), and 4(e) are timing charts which demonstrate changes in drive signals and determination voltage in the presence of overcurrent;

FIG. 5 is a flowchart of a sequence of steps performing an overcurrent measuring task;

FIGS. 6(a), 6(b), 6(c), 6(d), and 6(e) are timing charts which demonstrate a change in drain-to-source voltage on which ringing noise is superimposed;

FIG. 7 is a view which demonstrates a frequency characteristic of an impedance of a damping device;

MODE FOR CARRYING OUT THE INVENTION

First Embodiment

The first embodiment which realizes an overcurrent measuring apparatus in this disclosure will be described below with reference to the drawings. A control system equipped with the overcurrent measuring apparatus in this embodiment may be used in a mobile object, a robot (e.g., an industrial robot), an electrical generator, or an elevator. The mobile object, as referred to therein, may include an automotive vehicle, an airplane, a ship, or a railway vehicle.

Figure 1:
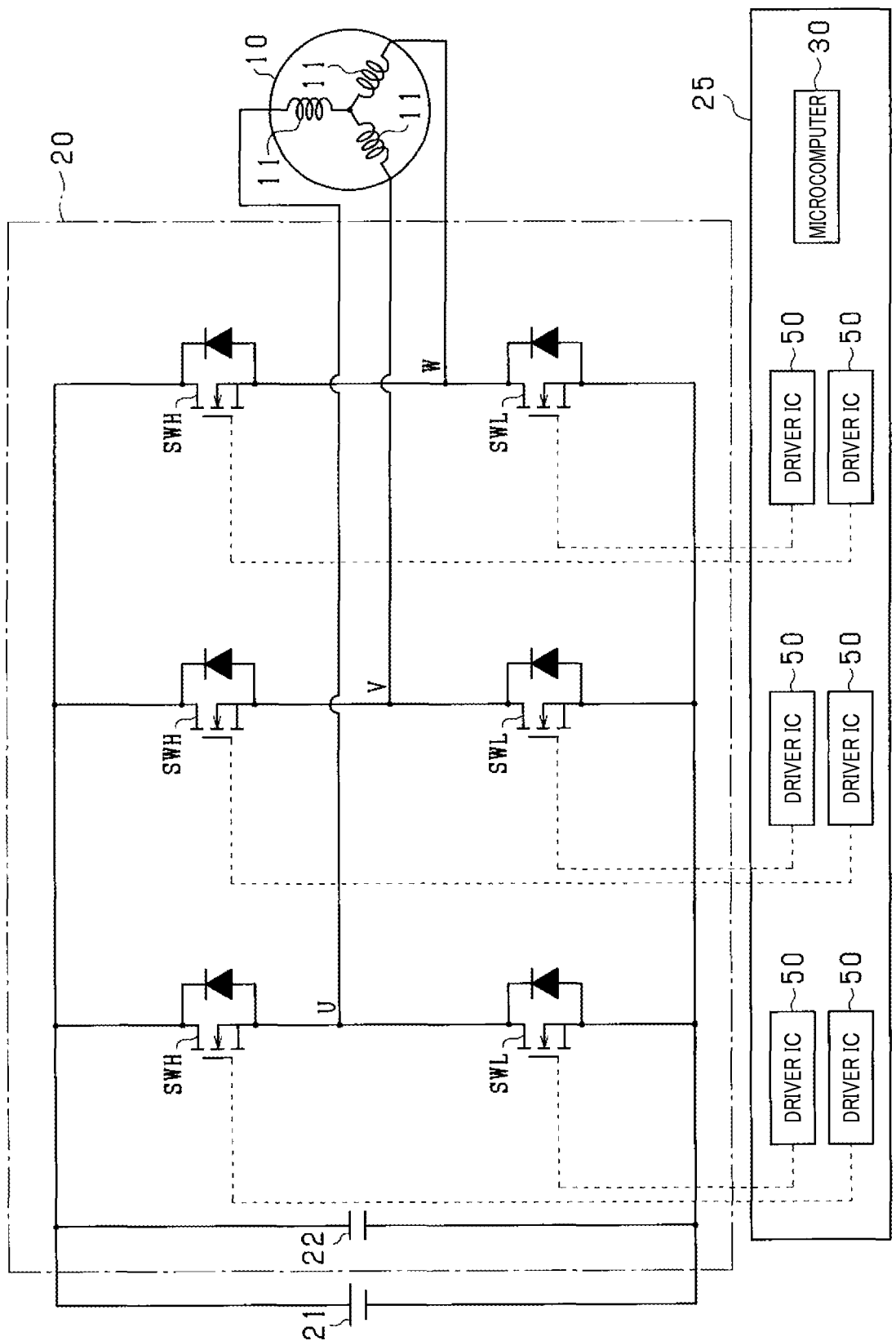
FIG. 1 is a block diagram which shows an overall structure of a control system according to the first embodiment.

The control system, as illustrated in FIG. 1, includes the rotating electrical machine 10, the inverter 20, and the direct-current power source 21. The rotating electrical machine 10 in this embodiment includes three-phase windings 11 which are star-connected together. The rotating electrical machine 10 is designed, for example, as a synchronous machine. In a case where the control system is used in an automotive vehicle, the rotating electrical machine 10 may be designed as an in-wheel motor installed in each drive wheel of the automotive vehicle or an on-board motor mounted on a body of the automotive vehicle. The inverter 20 may be configured as a single unit together with a gearbox or transmission, not shown.

The rotating electrical machine 10 connects with the direct-current power source 21 through the inverter 20. The direct-current power source 21 is made of, for example, a secondary battery. The direct-current power source 21 has a rated voltage of 100V or more. The inverter 20 has the smoothing capacitor 22 installed therein. The smoothing capacitor 22 may alternatively be arranged outside the inverter 20.

The inverter 20 includes three-phase upper and lower arm switches SWH and SWL. In this embodiment, each of the switches SWH and SWL is implemented by a voltage-controlled semiconductor switch, such as an n-channel SiC-MOSFET. Each of the switches SWH and SWL, therefore, has a high-potential terminal in the form of a drain and a low-potential terminal in the form of a source. Each of the switches SWH and SWL is also equipped with a body diode.

Each of the switches SWH and SWL may alternatively be made of an IGBT. In this case, each of the switches SWH and SWL has a high-potential terminal in the form of a collector and a low-potential terminal in the form of an emitter.

Each of the upper arm switches SWH connects at a drain thereof to a first end of the smoothing capacitor 22. Each of the upper arm switches SWH has a source to which a drain of a corresponding one of the lower arm switches SWL connects. Each of the lower arm switches SWL has a source to which a second end of the smoothing capacitor 22 connects. The source of each of the upper arm switches SWH and the drain of a corresponding one of the lower arm switches SWL connect with the first end of a corresponding one of the three-phase windings 11 of the rotating electrical machine 10. The three-phase windings 11 have second ends connected together at a neutral point.

The control system also includes the control board 25, the microcomputer 30, and the driver ICs 50. The driver ICs 50 are arranged one for each of the switches SWH and SWL.

The microcomputer 30 works to control switching operations of the switches SWH and SWL of the inverter 20 to bring a control variable, such as torque, provided by the rotating electrical machine 10 into agreement with a target value (i.e., a command value). The microcomputer 30 produces and outputs drive signals GH and GL to alternately turn on or off each of the upper arm switches SWH and a corresponding one of the lower arm switches SWL.

The microcomputer 30 is disposed in a low-voltage region, while the rotating electrical machine 10, the switches SWH and SWL, the driver ICs 50, the direct-current power source 21, and the smoothing capacitor 22 are disposed in a high-voltage region.

Figure 2:
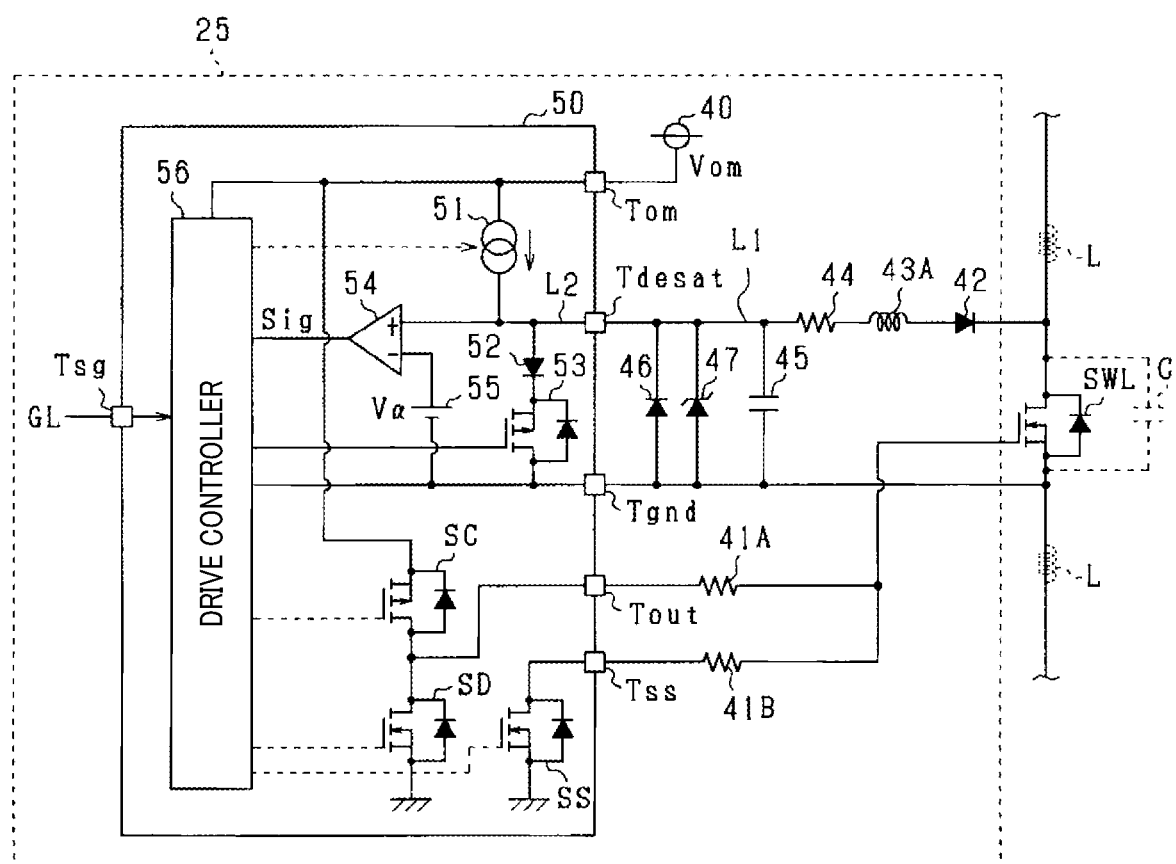
FIG. 2 is a view which illustrates a driver IC and a peripheral circuit.

The driver ICs 50 and a peripheral circuit will be described below with reference to FIG. 2. The driver ICs 50 are identical in structure with each other. For the brevity of disclosure, the following discussion will refer only to one of the driver ICs 50 which is used with a corresponding one of the lower arm switches SWL.

The driver IC 50 has the supply terminal Tom connecting with the power supply 40. The power supply 40 is made of a constant-voltage power supply producing the output voltage Vom. The output voltage Vom produced by the power supply 40 is lower in level than an output voltage produced by the direct-current power source 21.

The driver IC 50 is equipped with the charging switch SC and the discharging switch SD. In this embodiment, the charging switch SC is made of a p-channel MOSFET. The discharging switch SD is made of an n-channel MOSFET. The charging switch SC has a source connecting with the supply terminal Tom. The charging switch SC also has a drain connecting with the output terminal Tout of the driver IC 50.

The control board 25 has the gate resistor 41A mounted thereon. The gate resistor 41A has a first end connecting with the output terminal Tout. The gate resistor 41A also has a second end connecting with the gate of the lower arm switch SWL. The gate of the lower arm switch SWL also connects with the ground terminal Tgnd of the driver IC 50. The output terminal Tout also connects with the drain of the discharging switch SD. The discharging switch SD has a source connecting with the ground terminal Tgnd.

The control board 25 also has the soft-shutdown resistor 41B mounted thereon. The soft-shutdown resistor 41B has a first end connecting with the gate of the lower arm switch SWL. The soft-shutdown resistor 41B also has a second end connecting with the protector terminal Tss of the driver IC 50. The soft-shutdown resistor 41B has a resistance value higher than that of the gate resistor 41A.

The driver IC 50 also includes the soft-shutdown switch SS. In this embodiment, the soft-shutdown switch SS is made of an n-channel MOSFET. The soft-shutdown switch SS has a drain connecting with the protector terminal Tss and also has a source connecting with the ground terminal Tgnd.

The control board 25 has the first electrical path L1 formed thereon. The first electrical path L1 has a first end connecting with the drain of the lower arm switch SWL. The first electrical path L1 also has a second end connecting with the sensing terminal Tdesat of the driver IC 50.

The control board 25 also has the diode 42, the damping device 43A, the filter resistor 44, and the capacitor 45 mounted thereon. The diode 42 is disposed on the first electrical path L1 with a cathode facing the drain of the lower arm switch SWL. The first electrical path L1 has mounted thereon the damping device 43A located closer to the sensing terminal Tdesat than the diode 42 is. The first electrical path L1 also has mounted thereon the filter resistor 44 located closer to the sensing terminal Tdesat than the damping device 43A is. The capacitor 45 has a first end connecting with a portion of the first electrical path L1 which is located closer to the sensing terminal Tdesat than the filter resistor 44 is. The capacitor 45 also has a second end connecting with the ground terminal Tgnd and the source of the lower arm switch SWL. In this embodiment, the damping device 43A is made of an inductor that is a passive device. Specifically, the damping device 43A is made of a ferrite bead.

The control board 25 also has the protective diode 46 and the protector Zener diode 47 mounted thereon. The protective diode 46 and the protector Zener diode 47 have cathodes connecting with portions of the first electrical path L1 which are located closer to the sensing terminal Tdesat than a joint of the first electrical path L1 with the capacitor 45 is. The protective diode 46 and the protector Zener diode 47 have anodes connecting with the ground terminal Tgnd. The protective diode 46 is provided to prevent the ground terminal Tgnd from having a potential excessively higher than that at the sensing terminal Tdesat. Similarly, the protector Zener diode 47 is provided to prevent the sensing terminal Tdesat from having a potential excessively higher than that at the ground terminal Tgnd.

The driver IC 50 also includes the constant-current power supply 51, the intrinsic diode (i.e., body diode) 52, the reset switch 53, the comparator 54, the reference supply 55, and the second electrical path L2. In this embodiment, the reset switch 53 is made of a p-channel MOSFET.

The second electrical path L2 extends to connect the sensing terminal Tdesat and a non-inverting input terminal of the comparator 54 together. The constant-current power supply 51 connects with the supply terminal Tom to receive supply of electricity from the power supply 40 to output a constant-current. The second electrical path L2 connects with an anode of the intrinsic diode 52. The intrinsic diode 52 has a cathode connecting with a source of the reset switch 53. The reset switch 53 connects at a drain thereof to the ground terminal Tgnd.

The comparator 54 has a non-inverting input terminal to which a determination voltage Vdeast that is a terminal-to-terminal voltage at the capacitor 45 is inputted through the second electrical path L2. The comparator 54 has an inverting input terminal connecting with a positive terminal of the reference supply 55. The reference supply 55 has a negative terminal connecting with the ground terminal Tgnd. The comparator 54 has an inverting input terminal to which the overcurrent threshold Va that is an output voltage at the reference supply 55 is inputted. Specifically, the comparator 54 works to measure a terminal-to-terminal voltage appearing at the capacitor 45 based on a reference potential (0V) that is an electric potential at the ground terminal Tgnd and compare the measured voltage with the overcurrent threshold Va. The comparator 54 produces an output signal Sig which is inputted to the drive controller 56 installed in the driver IC 50.

The drive controller 56 connects with the supply terminal Tom and the ground terminal Tgnd. The drive controller 56 receives the drive signal GL which is outputted from the microcomputer 30 and inputted to the signal terminal Tsg of the driver IC 50. When determining the received drive signal GL to indicate an ON-command, the drive controller 56 performs a charging task to turn on the lower arm switches SWL. The charging task is to turn on the charging switch SC and turn off the discharging switch SD. This causes a gate voltage at the lower arm switch SWL to be higher than or equal to the threshold voltage Vth, thereby turning on the lower arm switch SWL.

When determining the drive signal GL to be an Off-command, the drive controller 56 performs a discharging task to turn off the lower arm switches SWL. The discharging task is to turn off the charging switch SC and turn of the discharging switch SD. This causes the gate voltage at the lower arm switch SWL to be lower than the threshold voltage Vth, thereby turning off the lower arm switch SWL.

The functions performed by the drive controller 56 may be realized by a combination of software, as stored in a physical memory device, a computer implementing the software, and/or hardware.

In the charging task, the drive controller 56 works to perform an overcurrent measuring task. In this embodiment, the drive controller 56, the comparator 54, and the reference supply 55 function as an overcurrent measuring device. The overcurrent measuring task will be described below, taking the low switch SWL as an example, with reference to FIGS. 3(a) to 4(e).

FIGS. 3(a) to 3(e) illustrate for the case where no overcurrent flows through the lower arm switch SWL. FIG. 3(a) demonstrates a change in the drive signal GL inputted to the drive controller 56. FIG. 3(b) demonstrates a change in gate voltage Vgs appearing at the gate of the lower arm switch SWL. FIG. 3(c) demonstrates a change in drain current Ids flowing through the drain of the lower arm switch SWL. FIG. 3(d) demonstrates a change in determination voltage Vdeast. FIG. 3(e) demonstrates a change in drain-to-source voltage Vds at the lower arm switch SWL.

At time t1, the drive controller 56 determines that the OFF-command has been changed to the ON-command and then start performing the charging task. This causes the gate voltage Vgs to start rising. At time t2 after a lapse of filtering time tf from time t1, the drive controller 56 starts outputting the constant current from the constant-current power supply 51 with the reset switch 53 kept off. This causes electrical current to flow from the constant-current power supply 51 to the capacitor 45, so that the determination voltage Vdeast rises from zero. In the example illustrated in FIGS. 3(a) to 3(e), no overcurrent flows, so that the determination voltage Vdeast does not rise up to the overcurrent threshold Va. In the example of FIGS. 3(a) to 3(e), the end of the filtering time tf is set in a period of time in which the gate voltage Vgs is kept at the mirror voltage Vmil.

FIGS. 4(a) to 4(e) illustrate the case where an overcurrent flows through the lower arm switch SWL. Specifically, FIGS. 4(a) to 4(e) demonstrate the case where the upper arm switch SWH which is a mate of the lower arm switch SWL is short-circuited, and the lower arm switch SWL is changed to the on-state, so that a short-circuit current flows through the upper and lower arm switches SWH and SWL. FIGS. 4(a) to 4(e) correspond to FIGS. 3(a) to 3(e).

At time t1, the drive controller 56 determines that the OFF-command has been changed to the ON-command and starts performing the charging task, so that the gate voltage Vgs rises. At time t2 after a lapse of filtering time tf from time t1, the drive controller 56 starts outputting the constant current from the constant-current power supply 51 with the reset switch 53 kept off, so that the determination voltage Vdeast rises from zero.

In the example in FIGS. 4(a) to 4(e), the overcurrent (i.e., the short-circuit current) flows through the upper and lower arm switches SWH and SWL, so that the determination voltage Vdeast then reaches the overcurrent threshold Va at time t3. This causes the output signal Sig from the comparator 54 to be changed to a logic high level. The drive controller 56, therefore, determines that the overcurrent is flowing and performs a soft-shutdown task. Note that the flow of short-circuit current is also created when the upper arm switch SWH is short-circuited during the on-state of the lower arm switch SWL.

FIG. 5 is a flowchart of a sequence of logical steps of overcurrent measurement made by the drive controller 56.

After entering the program, the routine proceeds to step S10 wherein it is determined whether the drive signal GL has been changed from the OFF-command to the ON-command.

If a YES answer is obtained in step S10, then the routine proceeds to step S11 wherein the charging task is performed to turn on the charging switch SC and turn off the discharging switch SD. The soft-shutdown switch SS is also turned off.

The routine proceeds to step S12 wherein it is determined whether the filtering time tf has passed since a YES answer was obtained in step S10. If a NO answer is obtained, the routine repeats step S12.

Alternatively, if a YES answer is obtained in step S12, then the routine proceeds to step S13 wherein the reset switch 53 is turned off to start outputting the constant-current from the constant-current power supply 51. The current is, therefore, delivered from the constant-current power supply 51 to the capacitor 45.

The routine proceeds to step S14 wherein the output signal Sig from the comparator 54 is at the logic low level. If a YES answer is obtained meaning that the output signal Sig is at the logic low level, then the routine proceeds to step S15 wherein it is determined whether the drive signal GL has been changed from the ON-command to the OFF-command. If a NO answer is obtained meaning that the drive signal GL still indicates the ON-command, then the routine returns back to step S14.

Alternatively, if a YES answer is obtained in step S15 meaning that the ON-command has been changed to the OFF-command, then the routine proceeds to step S16, or if a NO answer is obtained in step S10, then the routine proceeds to step S16 wherein the charging task is performed to turn off the charging switch SC and turn on the discharging switch SD. The constant-current power supply 51 is also stopped from outputting the constant-current. The reset switch 53 is temporarily turned on to reset the determination voltage Vdeast to zero while the drive signal GL is indicating the Off-command.

If a NO answer is obtained in step S14 meaning that the output signal Sig from the comparator 54 is at the logic high level and that an overcurrent is flowing, then the routine proceeds to step S17 wherein a soft-shutdown task is performed to turn off the charging switch SC and the discharging switch SD and turn on the soft-shutdown switch SS. This enables the lower arm switch SWL to be turned off with a reduced degree of surge voltage arising from the turning off of the lower arm switch SWL.

The routine proceeds to step S18 wherein a logical value of a fail-signal FL outputted to the microcomputer 30 is changed. For instance, the logical value of the fail-signal FL is changed from the low level to the high level. The changing of the logical value of the fail-signal FL enables the microcomputer 30 to detect the fact that an overcurrent is flowing through the lower arm switch SWL.

Although omitted in FIGS. 3(e) and 4(e), ringing of the drain-to-source voltage Vds, as demonstrated in FIG. 6(e), actually occurs at the lower arm switch SWL due to the turning on of the lower arm switch SWL. FIGS. 6(a) to 6(e) correspond to FIGS. 3(a) to 3(e). The ringing is oscillation of intrinsic inductances L, such as conductors connected to the source and the drain of the lower arm switch SWL, as illustrated in FIG. 2, and an intrinsic capacitance C of the lower arm switch SWL. The ringing frequency fr may be expressed by the following equation Eq. 1.

$$fr = \frac{1}{2\pi\sqrt{L \cdot C}} \qquad \text{Eq. 1}$$

In a comparative example which includes no damping device 43A, the ringing will cause the determination voltage Vdeast, as illustrated in FIG. 6(d), to exceed the overcurrent threshold Va after time t2, thus resulting in erroneous determination that the overcurrent is now flowing.

The occurrence of the ringing also causes ringing noises to propagate to the ground terminal Tgnd, thereby resulting in a change in potential at the ground terminal Tgnd. This may result in a great deviation of the value of the overcurrent threshold Va from a proper value which leads to a risk that the accuracy in detecting the overcurrent may be lowered.

In order to alleviate the above drawback, this embodiment is designed to have the damping device 43A. The damping device 43A has the property that the impedance Z thereof, as demonstrated in FIG. 7, reaches a maximum value Zmax (e.g., 11000Ω) at a given frequency fp and becomes low away from the frequency fp. In the example illustrated in FIG. 7, the frequency fp is given by an intermediate value of a ringing frequency band Rngf of the drain-to-source voltage Vds at the lower arm switch SWL which results from switching between operating states of the lower arm switch SWL. The ringing frequency band Rngf is a range where the frequency of ringing noise added to the drain-to-source voltage Vds usually varies and may be determined mathematically or experimentally.

The property of the damping device 43A and the switching frequency fsw of each of the upper and lower arm switches SWH and SWL may be determined in the following way. The reference frequency fst is defined which corresponds to a value that is 1/100 of the maximum value Zmax of the impedance Z. The switching frequency fsw is defined to be lower than or equal to the reference frequency fst. The impedance Z of the damping device 43A at the switching frequency fsw is enabled to be close to zero. The switching frequency fsw may be selected in a range of 5 kHz to 25 kHz. The switching frequency fsw may be selected in a range of 18 kHz to 25 kHz in order to enhance the switching speed of the upper and lower arm switches SWH and SWL. Note that the switching frequency fsw is a reciprocal of the switching cycle time Tsw. Taking, as an example, the lower arm switch SWL, the switching cycle time Tsw is a time interval between when the drive signal GL is changed to the ON-command and when the drive signal GL is subsequently changed to the ON-command again.

Upon occurrence of the ringing demonstrated in FIG. 6(*e*), the damping device 43A, as illustrated in FIG. 3(*d*) or 4(*d*), serves to avoid the addition of ringing noise to the determination voltage Vdeast. This enables the overcurrent to be detected quickly without sacrificing the accuracy of sensing the overcurrent. The quick detection of the overcurrent is advantageous particularly when the switching frequency fsw set high. The quick detection of the overcurrent in the soft-shutdown task also enables the current rating or current capacity of the upper and lower arm switches SWH and SWL to be lowered, thereby permitting each of the upper and lower arm switches SWH and SWL to be made of a small-sized power device. This also enables the production cost of the control system to be reduced.

Figure 8:
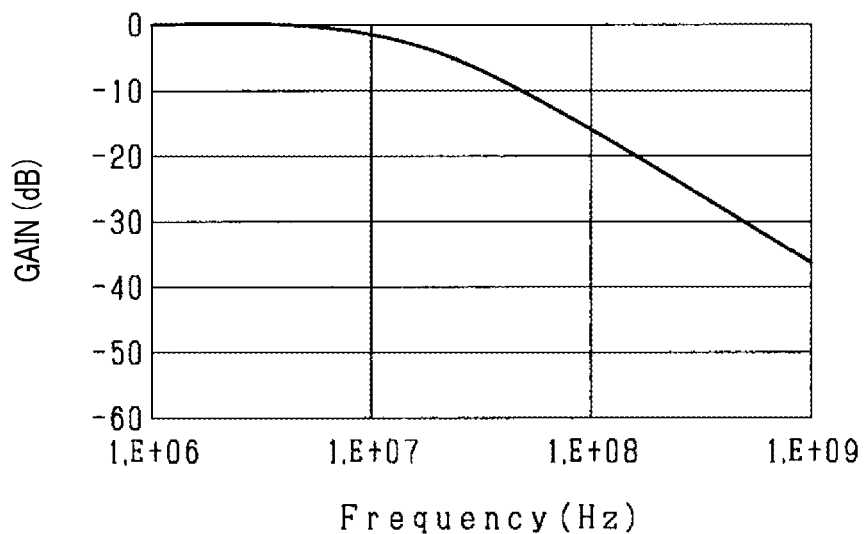
FIG. 8 is a view which demonstrates a frequency characteristic of a gain of an RC filer circuit.

The degree of ringing may be reduced by increasing the resistance value of the filter resistor 44 or the capacitance of the capacitor 45 which constitute a RC filter circuit. A frequency property of the RC filter circuit is shown in FIG. 8. Increasing the resistance value will result in an increased difference between the actual drain-to-source voltage and a measured value of the drain-to-source voltage, while increasing the capacitance of the capacitor 45 will result in a decrease in rate at which the voltage at the capacitor 45 rises. This results in a delay in detecting the overcurrent. It is, therefore, difficult to design the RC filter circuit to have a time constant suitable for reducing the ringing. For such a reason, this embodiment uses the damping device 43A.

The damping device 43A is arranged closer to the sensing terminal Tdesat than the diode 42 is in the first electrical path L1. This enables the damping device 43A to be made of a low-voltage device.

The damping device 43A is also located between the diode 42 and the filter resistor 44 in the first electrical path L1, thereby reducing the ringing noise in a portion of the first electrical path L1 close to the drain of the lower arm switch SWL. This greatly enhances the reduction in ringing noise. For instance, the propagation of the ringing noise to the ground terminal Tgnd through the capacitor 45 is decreased, thereby minimizing a variation in potential at the ground terminal Tgnd.

Modification of the First Embodiment

Figure 9:
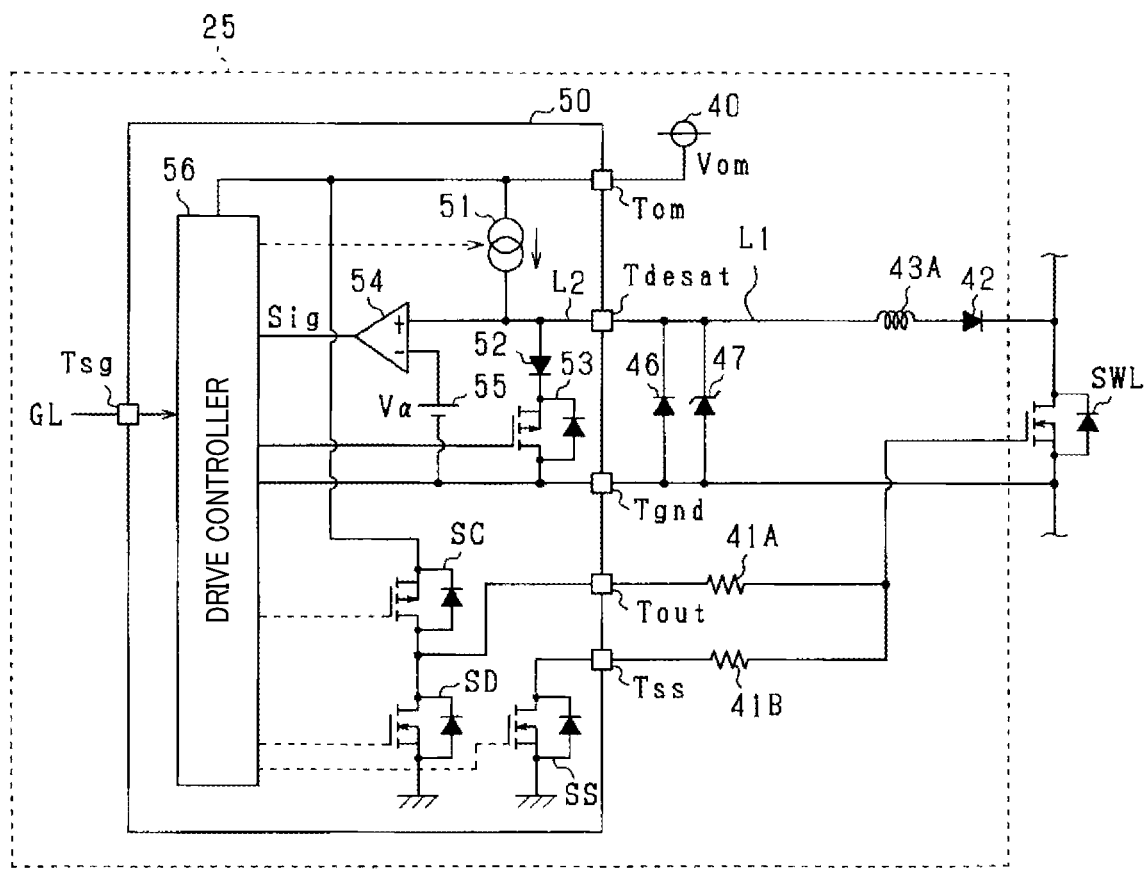
FIG. 9 is a view which illustrates a driver IC and a peripheral circuit in a modified form of the first embodiment.

The control board 25, as illustrated in FIG. 9, may be designed not to have the RC filter circuit including the filter resistor 44 and the capacitor 45. In this structure, the intrinsic capacitance of the protective diode 46 or the protector Zener diode 47 serves as a capacitor to detect the overcurrent in the form of a DESAT system. The same reference numbers in FIG. 9 as those in FIG. 2 indicate the same or similar parts, and explanation thereof in detail will be omitted here.

Second Embodiment

Figure 10:
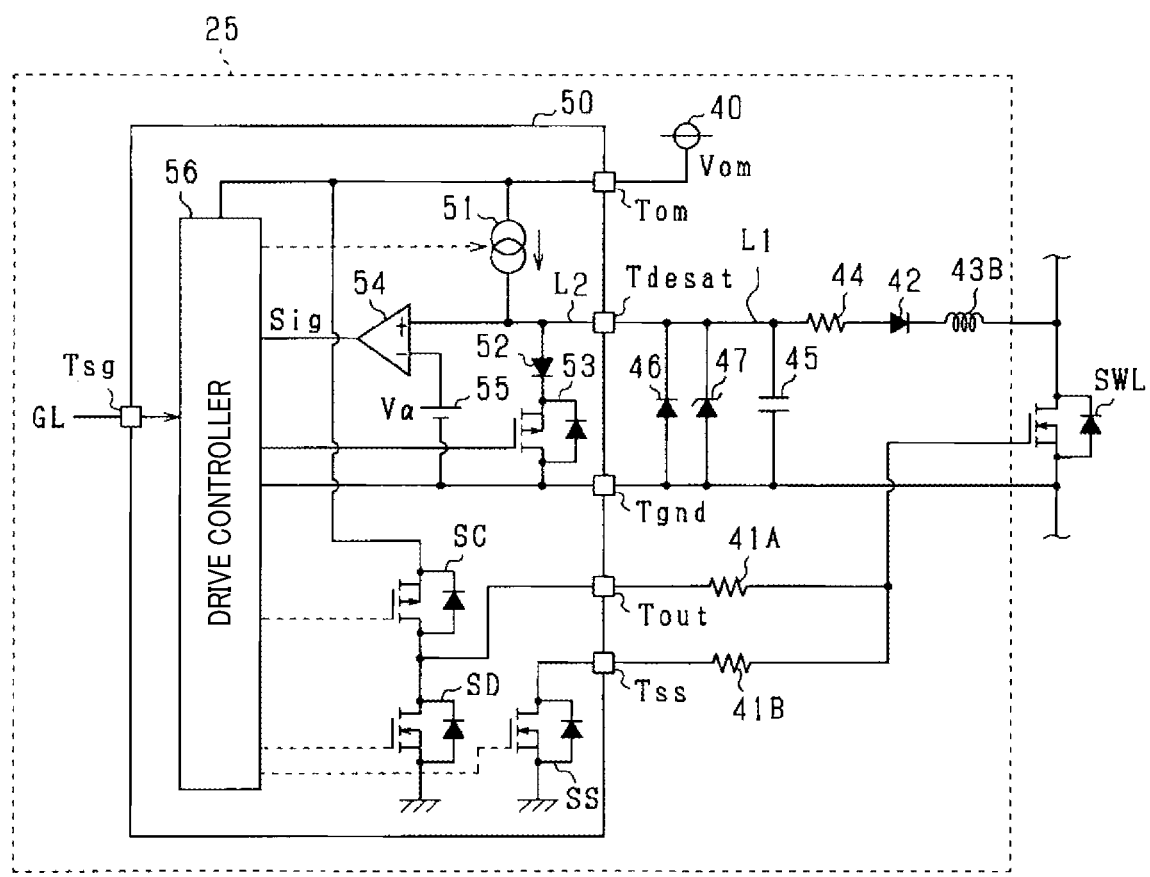
FIG. 10 is a view which illustrates a driver IC and a peripheral circuit in the second embodiment.

The second embodiment will be described below in terms of parts different from those in the first embodiment with reference to the drawing. The control board 25 in this embodiment, as can be seen in FIG. 10, includes the damping device 43B which is arranged closer to the drain of the lower arm switch SWL than the diode 42 is in the first electrical path L1. In FIG. 10, the same reference numbers as employed in FIG. 2 refer to the same parts for the sake of simplicity.

The structure in the second embodiment serves to eliminate a risk that the ringing noise is added to the diode 42. This enables the diode 42 to be made of a low-voltage device.

Third Embodiment

Figure 11:
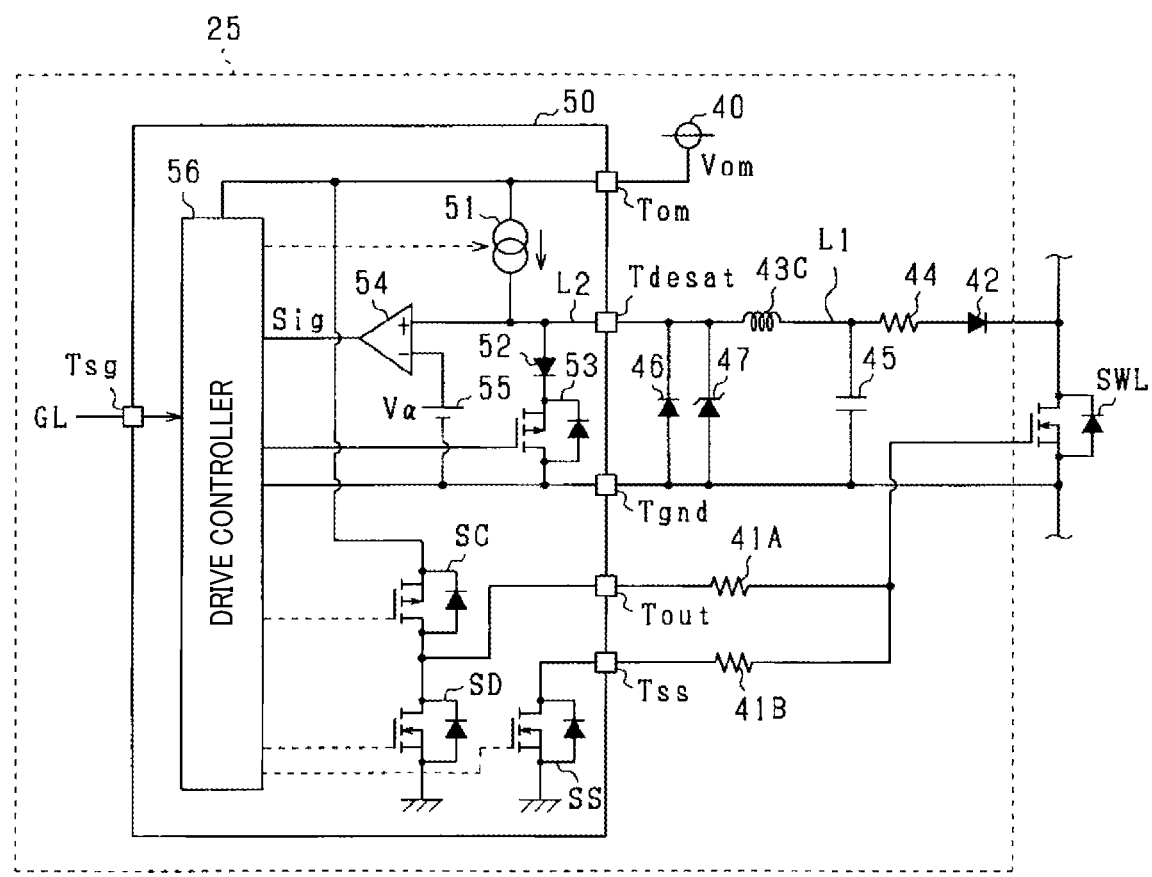
FIG. 11 is a view which illustrates a driver IC and a peripheral circuit in the third embodiment.

The third embodiment will be described below in terms of parts different from those in the first embodiment with reference to the drawing. The control board 25 in this embodiment, as can be seen in FIG. 11, has the damping device 43C which is arranged between a first joint of a portion of the first electrical path L1 to the capacitor 45 and second and third joints of portions of the first electrical path L1 to the protective diode 46 and the protector Zener diode 47. In FIG. 11, the same reference numbers as employed in FIG. 2 refer to the same parts for the sake of simplicity.

The structure in the third embodiment offers substantially the same beneficial advantages as those in the first embodiment.

Fourth Embodiment

Figure 12:
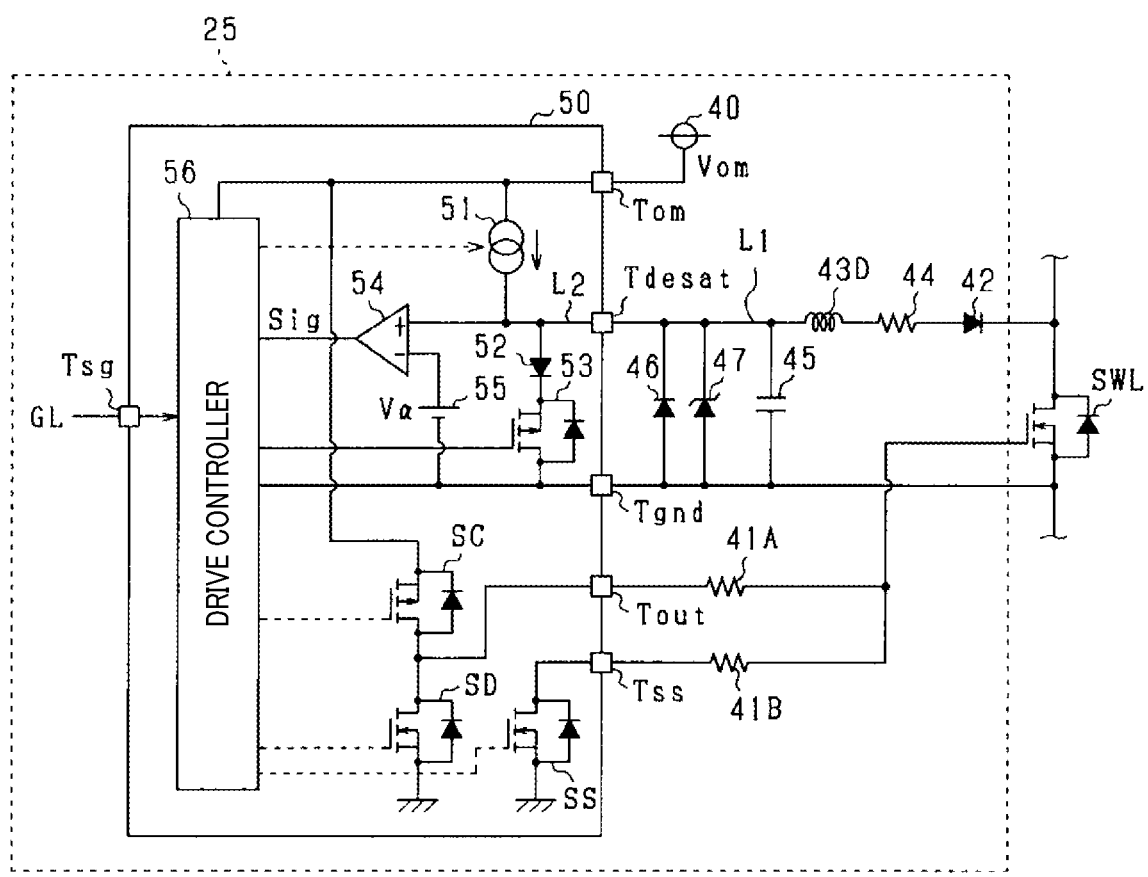
FIG. 12 is a view which illustrates a driver IC and a peripheral circuit in the fourth embodiment.

The fourth embodiment will be described below in terms of parts different from those in the first embodiment with reference to the drawing. The control board 25 in this embodiment, as can be seen in FIG. 12, has the damping device 43D which is arranged between a joint of a portion of the first electrical path L1 to the capacitor 45 and the filter resistor 44 in the first electrical path L1. In FIG. 12, the same reference numbers as employed in FIG. 2 refer to the same parts for the sake of simplicity.

The structure in the fourth embodiment offers substantially the same beneficial advantages as those in the first embodiment.

Fifth Embodiment

Figure 13:
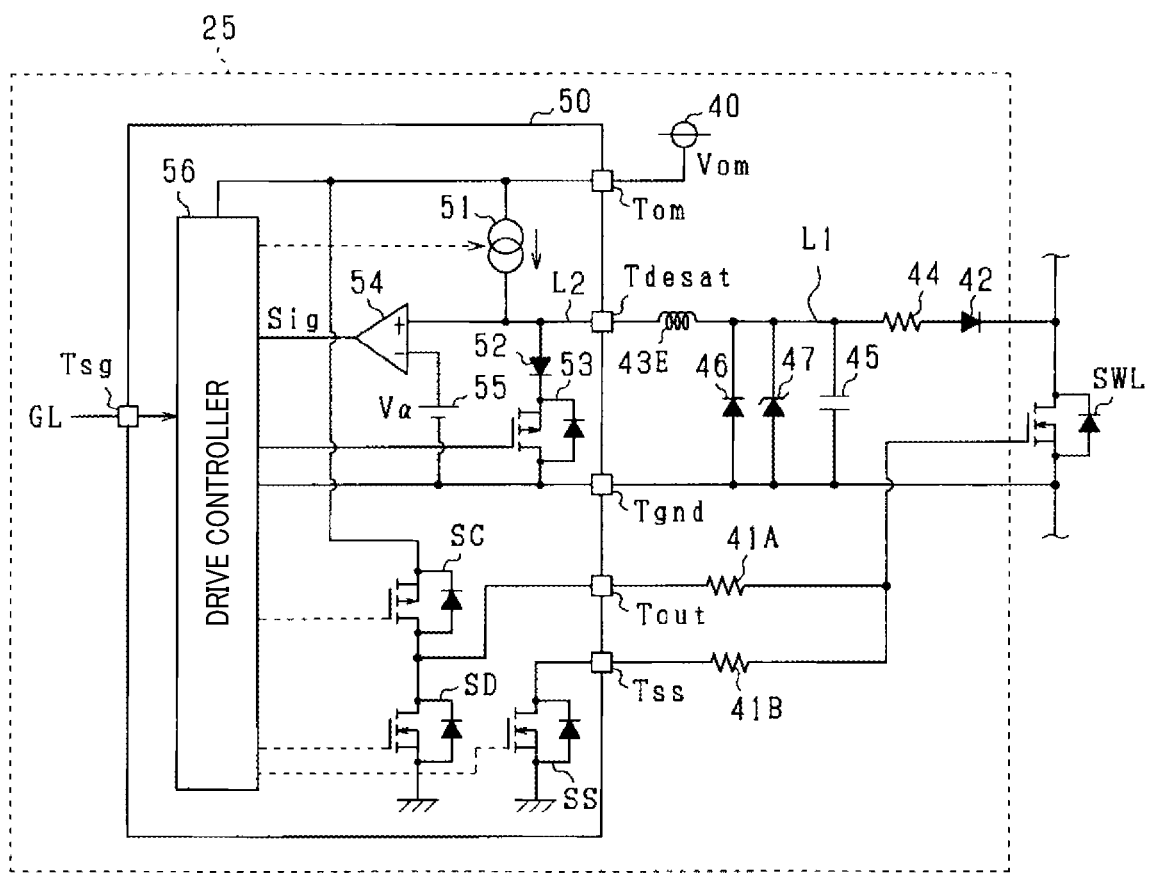
FIG. 13 is a view which illustrates a driver IC and a peripheral circuit in the fifth embodiment.

The fifth embodiment will be described below in terms of parts different from those in the first embodiment with reference to the drawing. The control board 25 in this embodiment, as can be seen in FIG. 13, has the damping device 43E which is arranged closer to the sensing terminal Tdesat than joints of portions of the first electrical path L1 to the protective diode 46 and the protector Zener diode 47 are in the first electrical path L1. In FIG. 13, the same reference numbers as employed in FIG. 2 refer to the same parts for the sake of simplicity.

The structure in the fifth embodiment offers substantially the same beneficial advantages as those in the first embodiment.

Sixth Embodiment

Figure 14:
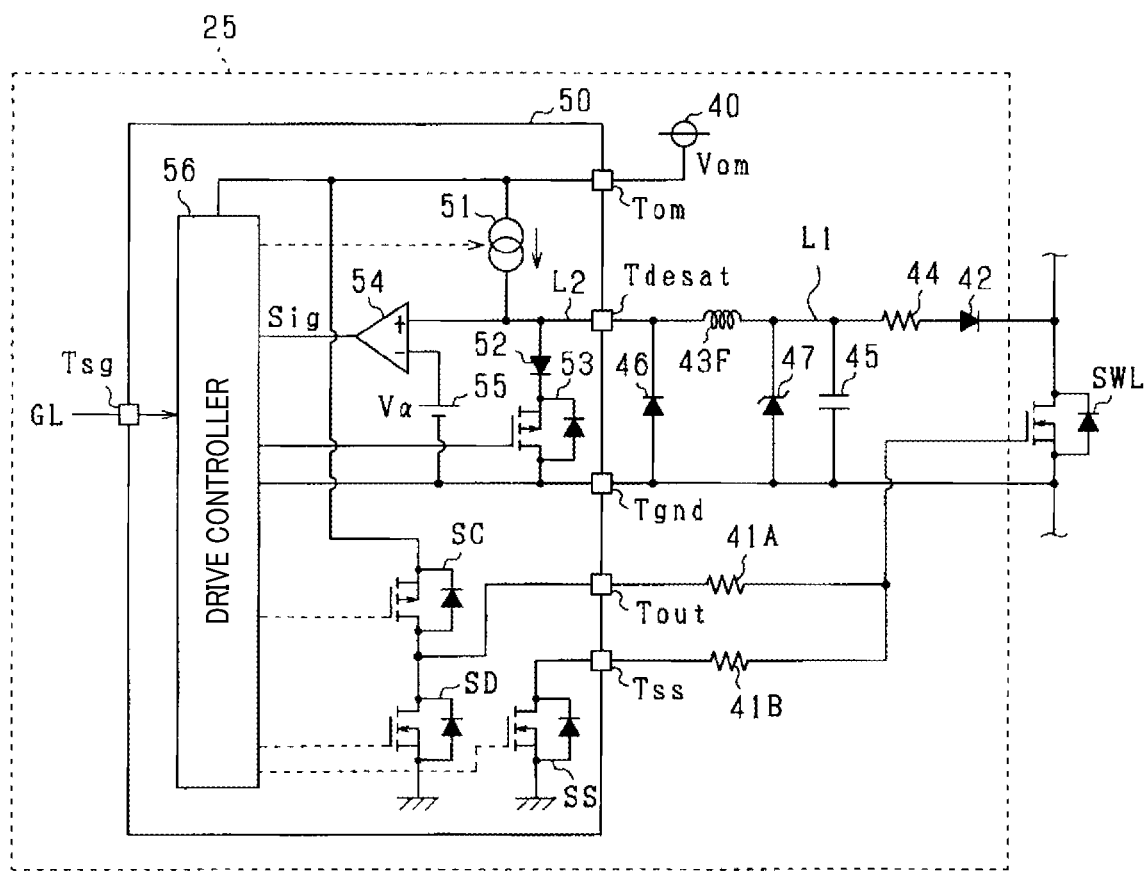
FIG. 14 is a view which illustrates a driver IC and a peripheral circuit in the sixth embodiment.

The sixth embodiment will be described below in terms of parts different from those in the first embodiment with reference to the drawing. The control board 25 in this embodiment, as can be seen in FIG. 14, has the damping device 43F which is arranged between a first joint of a portion of the first electrical path L1 and the protective diode 46 and a second joint of a portion of the first electrical path L1 and the protector Zener diode 47. In FIG. 14, the same reference numbers as employed in FIG. 2 refer to the same parts for the sake of simplicity.

The above-described embodiment offers substantially the same beneficial advantages as those in the first embodiment.

Seventh Embodiment

Figure 15:
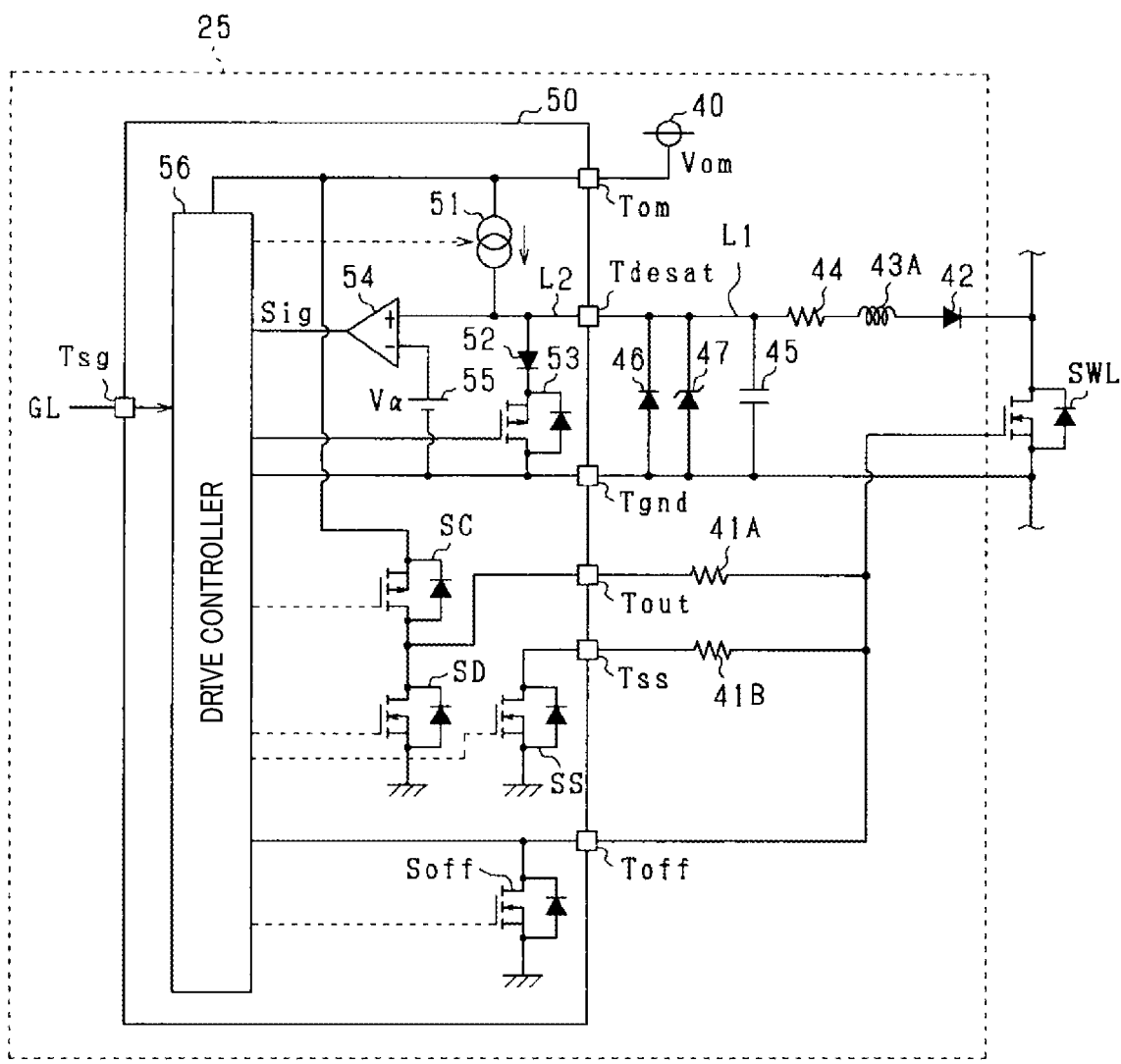
FIG. 15 is a view which illustrates a driver IC and a peripheral circuit in the seventh embodiment.

The seventh embodiment will be described below in terms of parts different from those in the first embodiment with reference to the drawing. The driver ICs 50 is, as illustrated in FIG. 15, equipped with the off-hold switch Soff. In FIG. 15, the same reference numbers as employed in FIG. 2 refer to the same parts for the sake of simplicity.

The off-hold switch Soff is made of an n-channel MOSFET. The off-hold switch Soff has a drain connecting with the hold-terminal Toff of the driver ICs 50. The off-hold switch Soff also has a source connecting with the ground terminal Tgnd. The hold-terminal Toff connects with a gate of the lower arm switch SWL.

The hold-terminal Toff is also connected to the drive controller 56. The drive controller 56 uses an electrical potential appearing at the ground terminal Tgnd in the form of a reference potential (0V) to measure the gate-voltage Vgd developed at the lower arm switch SWL.

When performing the charging task, the drive controller 56 turns off the off-hold switch Soff. Alternatively, when it is required to perform the discharging task, and the measured gate voltage Vgd is higher than a predetermined voltage level, the drive controller 56 turns off the off-hold switch Soff. When it is required to perform the discharging task, and the measured gate voltage Vgd is lower than or equal to the predetermined voltage level, the drive controller 56 turns on the off-hold switch Soff. The predetermined voltage level is selected to be lower than or equal to the threshold voltage Vth for the lower arm switch SWL.

When the electrical potential at the ground terminal Tgnd has dropped due to the occurrence of ringing, it may result in decreased accuracy in measuring the gate voltage Vgd, which leads to a malfunction of the off-hold switch Soff. In order to alleviate such a drawback, this embodiment is designed to have the damping device 43A to minimize a risk that the off-hold switch Soff malfunctions due to the ringing.

Other Embodiments

Each of the above embodiments may be modified in the following ways.

The damping device may be made of a resistor. Describing such a case using the structure in FIG. 2 as an example, the control board 25 is designed to have mounted thereon both the filter resistor 44 and the resistor working as the damping device.

The electrical power converter equipped with upper and lower arm switches may be designed as a DC-to-DC converter as well as an inverter.

The controllers or operations thereof referred to in this disclosure may be realized by a special purpose computer which is equipped with a processor and a memory and programmed to execute one or a plurality of tasks created by computer-executed programs or alternatively established by a special purpose computer equipped with a processor made of one or a plurality of hardware logical circuits. The controllers or operations thereof referred to in this disclosure may alternatively be realized by a combination of an assembly of a processor with a memory which is programmed to perform one or a plurality of tasks and a processor made of one or a plurality of hardware logical circuits. Computer-executed programs may be stored as computer executed instructions in a non-transitory computer readable medium.

The present disclosure has been described above on the basis of the embodiments, but may include various modifications or equivalents. The present disclosure may also include a combination of the elements described above or improvements without departing from the concept and the scope of the claims.

The above embodiments realize the following unique structures.

First Structure

A switch overcurrent measuring apparatus is provided which comprises: (a) an electrical path (L1, L2) which has a first end connecting with a high potential terminal that is one of a pair of major terminals of a target-driven switch (SWH, SWL); (b) a diode (42) which is arranged in the electrical path to have a cathode facing the high potential terminal of the target-driven switch; and (c) an overcurrent measuring device which connects with a second end of the electrical path. After a command for the target-driven switch is changed to an ON-command, the overcurrent measuring device works to measure a voltage developed between the major terminals of the target-driven switch through the electrical path. When the voltage measured by the overcurrent measuring device is higher than an overcurrent threshold (Va), the overcurrent measuring device determines that an overcurrent is flowing between the major terminals of the target-driven switch. A damping device (42A to 43F) is arranged in the electrical path, the damping device having a property that an impedance thereof at a given frequency band is higher than that in a frequency band outside the given frequency band. The given frequency band includes a ringing frequency band (Rngf) of voltage which appears between the major terminals of the target-driven switch and arises from switching between operating states of the target-driven switch.

Second Structure

The switch overcurrent measuring apparatus, as set forth in "FIRST STRUCTURE", is provided which further comprises a filter circuit which includes a resistor (44) and a capacitor (45). The resistor (44) is disposed closer to the overcurrent measuring device than the diode is in the electrical path. The capacitor (45) connects between a portion of the electrical path which is located closer to the overcurrent measuring device than the resistor is and a low-potential terminal that is one of the major terminals of the target-driven switch. When voltage appearing at the capacitor which is measured after the command for the target-driven switch is changed to the ON-command exceeds the overcurrent threshold, the overcurrent measuring device determines that the overcurrent is flowing between the major terminals of the target-driven switch.

Third Structure

The switch overcurrent measuring apparatus, as set forth in "FIRST STRUCTURE" or "SECOND STRUCTURE, is provided in which the damping device (43A, 43C to 43F) is disposed closer to the overcurrent measuring device than the diode is in the electrical path.

Fourth Structure

The switch overcurrent measuring apparatus, as set forth in "FIRST STRUCTURE", is provided which further comprises a filter circuit which includes a resistor (44) and a capacitor (45). The resistor (44) is disposed closer to the overcurrent measuring device than the diode is in the electrical path. The capacitor (45) connects between a portion of the electrical path which is located closer to the overcurrent measuring device than the resistor is and a low-potential terminal that is one of the major terminals of the target-driven switch. When voltage appearing at the capacitor which is measured after the command for the target-driven switch is changed to the ON-command exceeds the overcurrent threshold, the overcurrent measuring device determines that the overcurrent is flowing between the major terminals of the target-driven switch. The damping device (43A) is disposed between the diode and the resistor in the electrical path.

Fifth Structure

The switch overcurrent measuring apparatus, as set forth in "SECOND STRUCTURE" or "FOURTH STRUCTURE", is provided which further comprises a driver IC (50) which includes the overcurrent measuring device. A portion of the electrical path which connects between the high potential terminal and a sensing terminal (Tdesat) of the driver IC is defined as a first 10) electrical path (L1). A portion of the electrical path which connects between the sensing terminal and the overcurrent measuring device in the driver IC is defined as a second electrical path (L2). The damping device, the resistor, and the diode are disposed in the first electrical path. The capacitor connects between the first electrical path and a ground terminal (Tgnd) that is a terminal of the driver IC and connects with the low-potential terminal. The overcurrent measuring device works to measure the voltage at the capacitor based on a reference potential that is an electrical potential appearing at the ground terminal.

Sixth Structure

The switch overcurrent measuring apparatus, as set forth in "FIRST STRUCTURE", is provided in which the damping device (43B) is arranged closer to the high potential terminal than the diode is in the electrical path.

Seventh Structure

The switch overcurrent measuring apparatus, as set forth in any one of "FIRST STRUCTURE" to "SIXTH STRUCTURE", is provided in which the damping device is designed to have a property that an Impedance thereof is maximized at a given frequency (fp) and decreases to a low frequency side or a high frequency side of the given frequency. The given frequency lies in the ringing frequency band.

What is claimed is:

1. A switch overcurrent measuring apparatus comprising:
   an electrical path which has a first end connecting with a high potential terminal that is one of a pair of major terminals of a target-driven switch;
   a diode which is arranged in the electrical path to have a cathode facing the high potential terminal of the target-driven switch; and
   an overcurrent measuring device which connects with a second end of the electrical path, wherein
   after a command for the target-driven switch is changed to an ON-command, the overcurrent measuring device works to measure a voltage developed between the major terminals of the target-driven switch through the electrical path,
   when the voltage measured by the overcurrent measuring device is higher than an overcurrent threshold, the overcurrent measuring device determines that an overcurrent is flowing between the major terminals of the target-driven switch,
   a damping device is arranged in the electrical path, the damping device having a property that an impedance thereof at a given frequency band is higher than that in a frequency band outside the given frequency band,
   the given frequency band includes a ringing frequency band of voltage which appears between the major terminals of the target-driven switch and arises from switching between operating states of the target-driven switch.

2. The switch overcurrent measuring apparatus as set forth in claim 1, wherein the damping device is disposed closer to the overcurrent measuring device than the diode is in the electrical path.

3. The switch overcurrent measuring apparatus as set forth in claim 1, wherein the damping device is designed to have a property that an impedance thereof is maximized at a given frequency and decreases to a low frequency side or a high frequency side of the given frequency,
   the given frequency lies in the ringing frequency band.

4. The switch overcurrent measuring apparatus as set forth in claim 1, further comprising a filter circuit which includes a resistor and a capacitor, the resistor being disposed closer to the overcurrent measuring device than the diode is in the electrical path, the capacitor connecting between a portion of the electrical path which is located closer to the overcurrent measuring device than the resistor is and a low-potential terminal that is one of the major terminals of the target-driven switch, and wherein
   when voltage appearing at the capacitor which is measured after the command for the target-driven switch is changed to the ON-command exceeds the overcurrent threshold, the overcurrent measuring device determines that the overcurrent is flowing between the major terminals of the target-driven switch.

5. The switch overcurrent measuring apparatus as set forth in claim 4, wherein the damping device is disposed closer to the overcurrent measuring device than the diode is in the electrical path.

6. The switch overcurrent measuring apparatus as set forth in claim 4, further comprising a driver IC which includes the overcurrent measuring device, and wherein
   a portion of the electrical path which connects between the high potential terminal and a sensing terminal of the driver IC is defined as a first electrical path,
   a portion of the electrical path which connects between the sensing terminal and the overcurrent measuring device in the driver IC is defined as a second electrical path,
   the damping device, the resistor, and the diode are disposed in the first electrical path,
   the capacitor connects between the first electrical path and a ground terminal that is a terminal of the driver IC and connects with the low-potential terminal,
   the overcurrent measuring device works to measure the voltage at the capacitor based on a reference potential that is an electrical potential at the ground terminal.

7. The switch overcurrent measuring apparatus as set forth in claim 4, wherein the damping device is designed to have a property that an impedance thereof is maximized at a given frequency and decreases to a low frequency side or a high frequency side of the given frequency,
   the given frequency lies in the ringing frequency band.

8. The switch overcurrent measuring apparatus as set forth in claim 1, further comprising a filter circuit which includes a resistor and a capacitor, the resistor being disposed closer to the overcurrent measuring device than the diode is in the electrical path, the capacitor connecting between a portion of the electrical path which is located closer to the overcurrent measuring device than the resistor is and a low-potential terminal that is one of the major terminals of the target-driven switch, and wherein when voltage appearing at the capacitor which is measured after the command for the target-driven switch is changed to the ON-command exceeds the overcurrent threshold, the overcurrent measuring device determines that the overcurrent is flowing between the major terminals of the target-driven switch, the damping device is disposed between the diode and the resistor in the electrical path.

9. The switch overcurrent measuring apparatus as set forth in claim 8, further comprising a driver IC which includes the overcurrent measuring device, and wherein a portion of the electrical path which connects between the high potential terminal and a sensing terminal of the driver IC is defined as a first electrical path, a portion of the electrical path which connects between the sensing terminal and the overcurrent measuring device in the driver IC is defined as a second electrical path, the damping device, the resistor, and the diode are disposed in the first electrical path, the capacitor connects between the first electrical path and a ground terminal that is a terminal of the driver IC and connects with the low-potential terminal, the overcurrent measuring device works to measure the voltage at the capacitor based on a reference potential that is an electrical potential at the ground terminal.

10. The switch overcurrent measuring apparatus as set forth in claim 8, wherein the damping device is designed to have a property that an impedance thereof is maximized at a given frequency and decreases to a low frequency side or a high frequency side of the given frequency, the given frequency lies in the ringing frequency band.

11. The switch overcurrent measuring apparatus as set forth in claim 1, wherein the damping device is arranged closer to the high potential terminal than the diode is in the electrical path.

12. The switch overcurrent measuring apparatus as set forth in claim 11, wherein the damping device is designed to have a property that an impedance thereof is maximized at a given frequency and decreases to a low frequency side or a high frequency side of the given frequency, the given frequency lies in the ringing frequency band.

* * * * *